United States Patent [19]

Wozniak

[11] 4,390,496
[45] Jun. 28, 1983

[54] GAGING DEVICE

[75] Inventor: Donald R. Wozniak, El Cajon, Calif.

[73] Assignee: Carpenter Technology Corporation, Reading, Pa.

[21] Appl. No.: 202,616

[22] Filed: Oct. 31, 1980

[51] Int. Cl.³ .............................................. G21C 17/00
[52] U.S. Cl. .................................... 376/245; 376/272; 33/174 PA
[58] Field of Search .............. 376/245, 272; 33/174 P, 33/174 R, 174 PA, 174 PB

[56] References Cited

U.S. PATENT DOCUMENTS

| | | | |
|---|---|---|---|
| 3,443,317 | 5/1969 | Grahmann | 376/245 |
| 3,621,580 | 11/1971 | Tovaglieri | 376/245 |
| 3,901,090 | 8/1975 | Akey et al. | 376/245 |
| 4,028,811 | 6/1977 | Hutter et al. | 376/245 |
| 4,036,686 | 7/1977 | Weilbacher et al. | 176/19 |
| 4,048,009 | 9/1977 | Weilbacher | 176/19 |
| 4,108,719 | 8/1978 | Olshausen | 376/245 |

Primary Examiner—Sal Cangialosi
Attorney, Agent, or Firm—Edgar N. Jay

[57] ABSTRACT

An in-basin measuring system for determining changes in the longitudinal profile of nuclear fuel channel members which have been subjected to radiation in the reactor core section while maintaining the protective shield provided by the deep water in the storage basin of a boiling water nuclear reactor. A holder is provided having a support for a channel member with means for moving the channel member into a stepped gage coupled with means for indicating the position of the channel member in the gage to determine the dimensional changes along the length of the channel member.

5 Claims, 3 Drawing Figures

U.S. Patent  Jun. 28, 1983  4,390,496
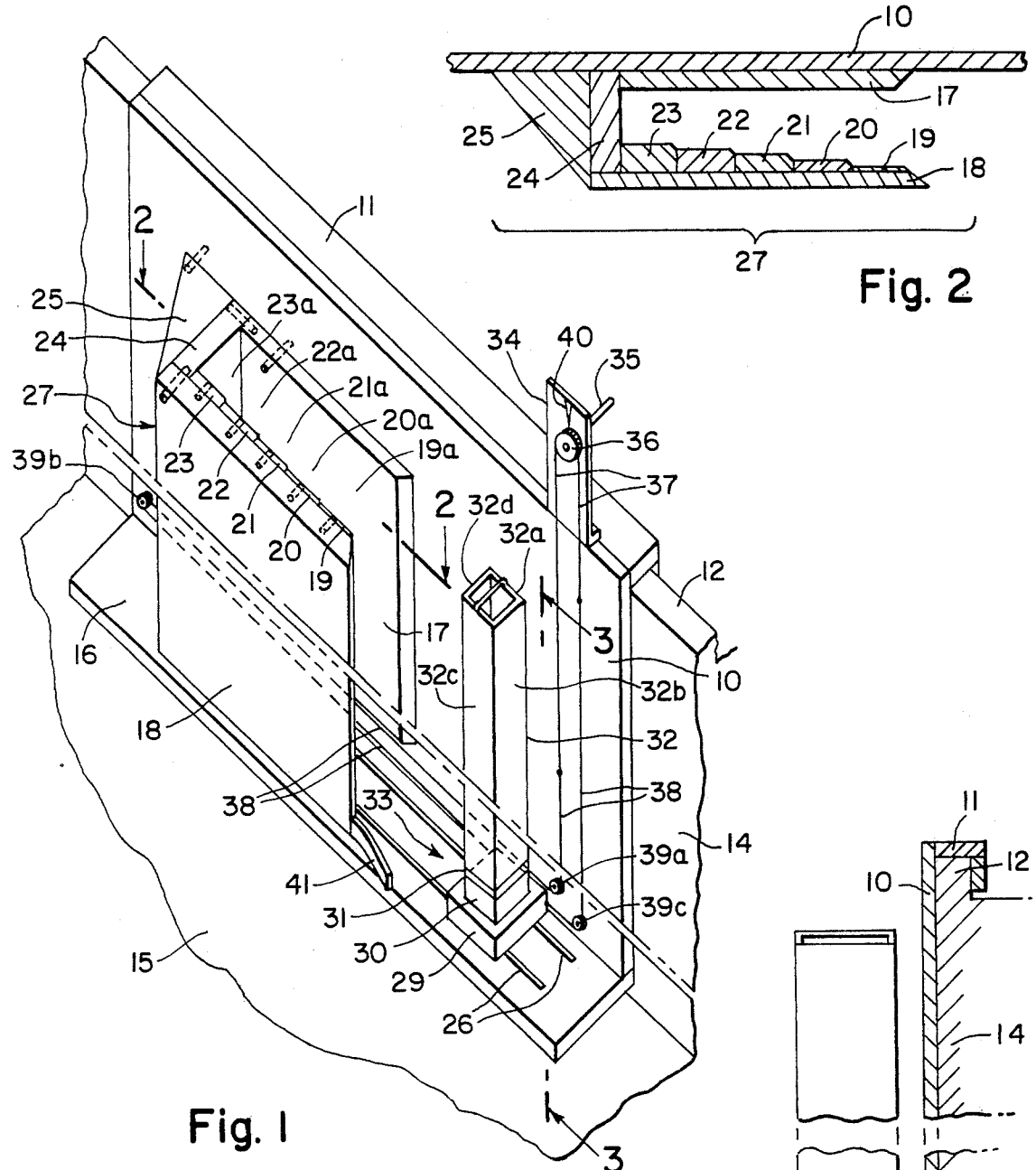
Fig. 2
Fig. 1
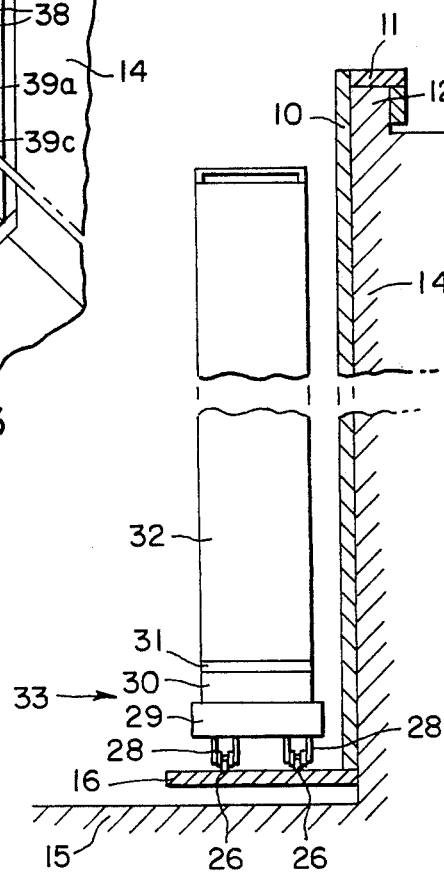
Fig. 3

GAGING DEVICE

BACKGROUND OF THE INVENTION

The present invention relates to a nuclear reactor and, more particularly, to a boiling water nuclear reactor having a storage basin with an improved gaging system for examination of nuclear fuel channel members.

In a boiling water reactor, nuclear fuel channel members are subjected to radiation exposure during the normal operation of the reactor. Radiation in the form of neutron flux, defined as the number of neutrons passing through a unit volume per unit of time, is not uniform over the length of the channel members. The lack of uniformity of the neutron flux is due to several factors including location of the channel member in the reactor core with respect to the core center and periphery, and the presence of adjacent control blades. Because the neutron flux is not uniform over the length of the channel members, anisotropic crystal growth results causing the channel members to grow longitudinally with the sides receiving the highest amount of radiation undergoing the greatest movement. The unequal growth causes bowing of the channel members along their longitudinal axes away from the high or maximum neutron flux regions. Additionally, deviations in cross section or swelling of the channel members appear to be caused by (1) action of fluid under pressure on the inside of the channel member, (2) temperature of the superheated water and (3) neutron flux, so that the channel members appear to swell or balloon outwardly.

In a boiling water nuclear reactor, the channel members direct the core coolant flow through and around each fuel bundle and also serve to guide the control rods. Excessive swelling or ballooning of the channel members near or adjacent to the lower end can result in improper flow of coolant through and around the fuel bundles causing overheating. The channel members also serve to guide the control rods or blades which must remain free to be moved in the close spaces provided for that purpose in the reactor core between adjacent channel members. Critical dimensions must therefore be maintained between adjacent channel members so as not to interfere with the insertion or withdrawal of the control rods in the reactor core. Such neutron flux induced dimensional changes in the channel members if left unchecked could result in a malfunction of the reactor. Also such radiation-induced changes occur at different rates depending upon the orientation and location of each channel member in the reactor core.

By determining the magnitude and direction of bowing, swelling and ballooning of each channel member, it has been found that an appropriate location within the reactor core could be selected so as to prolong the useful life of a given channel member. Extended life or use of channel members is achieved by moving them into an area of the reactor core where their longitudinal bow will not affect reactor performance.

There have hitherto been provided gages for the measurement of nuclear channel members. For example, one such device classified the channel members as acceptable or not acceptable with the result that all channel members found not acceptable were discarded. Other more complex and expensive measuring systems have been provided. For example, Weilbacher et al, U.S. Pat. No. 4,036,686 granted July 19, 1977 discloses a system for examination and measurement of nuclear fuel rods while submerged in the tank of a nuclear reactor which includes a movable carriage assembly with means for visual examination and for measurement of the fuel rods from a remote location, the carriage assembly traversing longitudinally from end to end along the fuel rods. Weilbacher, U.S. Pat. No. 4,048,009 granted Sept. 13, 1977 discloses a system for checking the straightness of the extensions of control rods of a nuclear reactor while submerged in a fuel storage pool by means of a vertically movable carriage with sensors which travel longitudinally from end to end along the control rod extensions including remote reading of the information outside the storage pool.

SUMMARY OF THE INVENTION

It is, therefore, a principal object of this invention to provide in the deep water storage basin of a boiling water nuclear reactor a reliable yet simple gaging system for use in classifying elongated channel members. A more specific object is to provide such a gaging system for determining or measuring the channel member profile relative to a first plane and also relative to a second plane perpendicular to the first plane.

In carrying out a preferred embodiment of the present invention there is provided a vertical support plate which is removably suspended from the lip of the storage basin by a horizontal L-shaped support member fastened to the upper end of the vertical support plate. A gage assembly including a guide plate and an opposed array of gage plates mounted thereon is fixed to the vertical support plate. A carriage assembly is provided adjacent to the lower end of the vertical support plate for carrying a channel member into and out of the gage assembly. Preferably, means are also provided to provide an indication of the position of the channel member relative to the array of gage plates.

DESCRIPTION OF THE DRAWINGS

Further objects and advantages of this invention will be apparent from the following detailed description of a preferred embodiment and the accompanying drawing in which:

FIG. 1 is a perspective view of a gaging system in a storage basin constructed according to the present invention and partially broken away for convenience;

FIG. 2 is a horizontal cross sectional view showing the gage plates or members thereof taken along the line 2—2 of FIG. 1; and FIG. 3 is a vertical cross sectional view showing the carriage assembly with a channel member seated thereon, taken along the line 3—3 of FIG. 1.

DESCRIPTION OF THE PREFERRED EMBODIMENT

Referring first to FIG. 1, the exemplary apparatus includes a rigid vertical support plate 10 suspended by means of an inverted L-shaped support member 11 in the storage basin of a boiling water nuclear reactor by seating the L-shaped support means 11 over lip 12 of storage basin wall 14, only a portion of which is shown. The vertical support plate 10 is connected to the L-shaped support member 11 by any convenient way, threaded fasteners being preferred. The L-shaped support member 11 is removably fastened to the lip 12 of the storage basin wall 14 by means of suitable masonary fasteners. The support plate 10 extends from the lip 12 of the storage basin wall 14 down toward but not necessarily to floor 15 of the storage basin. Fastened to the lower end of the vertical support plate 10 there is fixed, as by threaded fasteners, a horizontal base plate 16. An elongated gage guide plate 17 is mounted on the vertical support plate 10 by means of threaded fasteners and extends below the normal water level of the storage basin down toward but not necessarily to the horizontal base plate 16.

An elongated gage support plate 18 is provided having an array of gage plates 19–23 affixed thereto, preferably by means of threaded fasteners. The gage support plate 18 with gage plates 19–23 fixed thereto is mounted a predetermined distance from and parallel to guide plate 17 by means of an elongated spacer plate 24 connected to the adjacent ends of the support plate 18 and guide plate 17. The gage support plate 18 with the array of gage plates 19–23 mounted thereon and the spacer plate 24 connected thereto are rigidified and held in place by a plurality of braces 25 extending between and connected to the vertical support plate 10 and spacer plate 24 preferably by threaded fasteners. The arrangement is such that the gage plates 19–23 form stepped gage spacers 19a–23a respectively with the guide plate 17 that successively decrease from right to left of gage assembly 27 as viewed in FIG. 1.

As most clearly shown in FIGS. 1 and 3, a pair of guide rails 26 is mounted in spaced parallel relation on the base plate 16 by suitable fasteners. The center line or axis of guide rails 26 is aligned with the centerline of the smallest gage spacer 23a. A carriage assembly 33 having a base plate 29 is movable along the rails 26 on a plurality of flanged wheel assemblies 28 connected to carriage base plate 29. Preferably, the wheel assemblies 28 are connected to the carriage base plate 29 so as to minimize lateral movement of the carriage assembly 33 relative to the guide rails 26. A channel seating member 30 is fixed to the upper surface of the carriage base plate 29 and is shaped to accept and seat the lower portion of a tieplate 31 of a nuclear fuel channel 32. When as shown, the carriage base plate 29 extends at a level below that of the gage support plate 18, a resilient rub rail 41 is preferably suspended from support plate 18 to ensure the desired sliding contact between the inwardly presented surface of a fuel channel 32 carried on the carriage assembly 33 with the guide plate 17 as the fuel channel 32 is introduced into the gage spaces 19a–23a.

A preferred means for moving the carriage assembly 33 on the guide rails 26 and simultaneously indicating its position therealong, comprises a drive means including a sprocket 36 rotatable on a shaft 36 journaled through a support 34 fixed to the vertical support plate 10. The shaft 35 may be coupled to a motor (not shown). A coded link chain 37 engages the teeth of the sprocket 36 and is connected at its ends to the ends of a cable 38. Cable 38 is formed into two courses by pulleys 39a, 39b and 39c located on the vertical support plate 10 which are connected to opposite ends of base plate 29 of the carriage assembly 33. The position of the carriage assembly 33 relative to gage assembly 27 may be indicated by the coded links of the chain 37 on gear 36 in relation to pointer 40 or any other suitable remote indicating system can be used.

It is to be noted that the width of the gage spaces 19a–23a is not critical and any convenient sequence can be used as may be desired. However, the preferred arrangement is to utilize as the width of the smallest space 23a that which will just accept the maximum tolerable width or envelope acceptable for a fuel channel in those locations in that installation where the smallest envelope tolerances are required because of the anticipated exposure to conditions which adversely affect the dimensions and shape of the fuel channel. The largest space 19a is advantageously selected so as to correspond to the largest envelope that can be used and still provide an acceptably long useful life in the reactor core. The intermediate spaces are then scaled as desired between those extremes in selected increments of total fuel channel envelope tolerance so as to correspond to the useability of a fuel channel in different positions within the reactor. In operation, a fuel channel 32 to be tested is vertically aligned and positioned with its tieplate 31 seated on the support member 30 of the carriage assembly 33. Rotation of the shaft 35 in one direction actuates sprocket 36 to drive the chain 37 and cable 38 to move the carriage assembly 33 with the fuel channel 32 toward and into the gage assembly 27. Upon entrance into the gage assembly 27, channel surface 32a is in sliding contact with gage guide plate 17 while channel surface 32c is positioned facing the array of gage plates 19, 20, 21, 22 and 23 for measurement of any increase in profile along the a–c longitudinal axis of the fuel channel 32. Assuming there is no distortion such as bowing or swelling along the longitudinal axis of channel surface 32a or surface 32c, the fuel channel will advance through the successively decreasing gage spaces of the gage assembly 27 into gage space 23a. On the other hand, had there been any significant distortion, the extent thereof would determine the smallest gage space which would reject the fuel channel and at the same time provide an indication of the amount of the distortion.

In the foregoing discussion, it was assumed the surface 32a of the fuel channel was free of distortion or if distorted it was in the direction away from the guide plate 17 (FIG. 1). If surface 32a had been distorted in the opposite sense, the fuel channel 32 would not enter the gage assembly 27 because of engagement with the leading edge of guide plate 17. Measurement of distortion along the a–c axis of the fuel channel would be completed when the fuel channel 32 had been rotated to bring surface 32c facing toward guide plate 17. Rotation of the shaft 35 in the opposite direction removes the fuel channels from the gage assembly 27. Fuel channel 32 is lifted, rotated 90° and then reseated with channel surface 32d presented toward the gage guide plate 17 and channel surface 32b presented toward the gage plate 18. As before the carriage assembly 33 and fuel channel 32 are advanced toward the gage assembly 27, and the channel surface 32 which will be in sliding contact with the gage guide plate 17 must be free of significant outward distortion for the fuel channel to enter the gage assembly 27. Assuming channel member surface 32d is free of such distortion, the channel member 32 is advanced into the gage assembly 27. The smallest gage space into which the channel member 32 will pass determines the dimensional profile or envelope of fuel channel 32 in a plane perpendicular to surface 32b.

It is to be noted that when a fuel channel 32 is seated on the carriage assembly 33 and the surface which is to be in parallel sliding contact with the gage guide plate 17 has become outwardly bowed, swelled or otherwise distorted outwardly in service, the fuel channel 32 will not enter the gage assembly 27. It is then necessary to rotate the channel member 180° and present the bowed channel member surface to the gage side of the gage assembly 27 to determine the extent of the distortion to said surface. In this way both the amount of distortion and the side of the fuel channel so distorted are identified. This facilitates selection of a location in the reactor and orientation of the fuel channel for further use of the fuel channel.

It is to be understood that the dimensions and relative proportions of the gage apparatus of the present invention may be varied as desired to meet the specifications or requirements of a given reactor installation and, more particularly, according to the tolerances specified for the channel members used in the reactor. It is also apparent that the gaping apparatus could contain any desired number of steps or spaces to provide the desired degree of precision in examination of the channel members. It should also be understood that the gage apparatus of the present invention could be installed during the initial construction of a reactor with the sprocket support plate 34 being connected to the storage basin lip 10, the gage assembly 27 and pulleys 39 connected to the storage basin wall 14 and the guide rails 26 connected to the storage basin floor 15.

Preferably, A.I.S.I. Type 304 stainless steel is used for making the metal parts of the apparatus; however, other suitable stainless steels or corrosion resistant materials can be used.

The terms and expressions which have been employed are used as terms of description and not of limitation, and there is no intention in the use of such terms and expressions of excluding any equivalents of the features shown or described or portions thereof, but it is recognized that various modifications are possible within the scope of the invention claimed.

I claim:

1. In a nuclear reactor having a deep water storage basin for irradiated members including fuel channels, a measuring system for measuring radiation induced fuel channel distortion while the fuel channels are under water in which a gage assembly is suspended under water in said storage basin, said gage assembly comprising a guide plate and a plurality of elongated stepped gage plates supported in juxtaposed spaced relation to said guide plate and thereby forming a plurality of graduated elongated gage spaces decreasing in width in a predetermined direction, and means for moving a fuel channel in said predetermined direction into said gage spaces and then moving it out of the same.

2. The apparatus of claim 1 wherein said support means includes a support plate on which said gages are supported in fixed relation, and an elongated spacer plate connecting said support plate in fixed juxtaposed spaced relation to said gage guide plate.

3. The apparatus of claim 1 or 2 wherein said moving means includes a carriage assembly for supporting said fuel channel.

4. The apparatus of claim 3 wherein said moving means includes means for indicating the position of said fuel channel relative to said gage spaces.

5. The apparatus of claim 1 or 2 wherein said moving means includes means for indicating the position of said fuel channel relative to said gage spaces.

* * * * *

UNITED STATES PATENT AND TRADEMARK OFFICE
CERTIFICATE OF CORRECTION

PATENT NO. : 4,390,496

DATED : June 28, 1983

INVENTOR(S) : Donald R. Wozniak

It is certified that error appears in the above—identified patent and that said Letters Patent is hereby corrected as shown below:

Col. 2, line 60 for "means" read -- member --.

Col. 3, line 23 for "spacers" read -- spaces --

Col. 3, line 30 for "spacer" read -- space --

Col. 5, line 12 for "gaping" read -- gaging --

Signed and Sealed this

Third Day of January 1984

[SEAL]

Attest:

GERALD J. MOSSINGHOFF

*Attesting Officer*     *Commissioner of Patents and Trademarks*